US006757474B2

(12) United States Patent
Anderson et al.

(10) Patent No.: US 6,757,474 B2
(45) Date of Patent: Jun. 29, 2004

(54) EMISSION SILICATE WAVEGUIDE COMPOSITIONS FOR ENHANCED L-BAND AND S-BAND EMISSION

(75) Inventors: Mark T. Anderson, Woodbury, MN (US); Craig R. Schardt, Saint Paul, MN (US); James R. Onstott, Dresser, WI (US); Kenton D. Budd, Woodbury, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 43 days.

(21) Appl. No.: 10/299,222

(22) Filed: Nov. 19, 2002

(65) Prior Publication Data

US 2003/0147619 A1 Aug. 7, 2003

Related U.S. Application Data

(60) Provisional application No. 60/345,077, filed on Dec. 31, 2001, and provisional application No. 60/345,076, filed on Dec. 31, 2001.

(51) Int. Cl.$^7$ ................................................ G02B 6/00
(52) U.S. Cl. ..................... 385/142; 156/158; 428/402; 501/45
(58) Field of Search ................. 385/14–15, 129–142, 385/147; 156/158; 428/402; 501/45

(56) References Cited

U.S. PATENT DOCUMENTS

| | | | |
|---|---|---|---|
| 5,206,925 A | 4/1993 | Nakazawa et al. | |
| 5,712,941 A | 1/1998 | Imoto et al. | |
| 6,690,868 B2 * | 2/2004 | Anderson et al. | 385/123 |

(List continued on next page.)

FOREIGN PATENT DOCUMENTS

| | | |
|---|---|---|
| EP | 0443781 A1 | 2/1991 |
| EP | 1091461 A1 | 4/2001 |
| KR | 2000-0027961 | 5/2000 |
| WO | WO 00/55101 | 9/2000 |
| WO | WO 01/92173 A1 | 12/2001 |

OTHER PUBLICATIONS

A. Mori, et al; "1.5 μm Broadband Amplification by Tellurite–Based EDFAs"; *Conference on Optical Fiber Communications, Technical Digest, Postconference Ed.* OSA Technical Digest Series vol. 6; 1997; pp. 371–374; Optical Society of America.

R.L. Shubochkin, et al; "$Er^{3+}$—$Tm^{3+}$ Co–doped Silica Fiber Laser"; *Osa Tops*, vol. 26 Advanced Solid–State Lasers; 1999; pp. 167–171; Optical Society of America.

H. Jeong & K. Oh; "Characterization of Amplified Spontaneous Emission Light Source from an $Er^{3+}/Tm^{3+}$ Co–doped Silica Fiber"; *Conference on Lasers and Electro–Optics, Technical Digest, Postconference Ed.* TOPS vol. 39; 2000; pp. 544–545; Optical Society of America.

"Lucent Technologies announces two new erbium–doped fibers for the extended L–band the C–band"; Lucent Technologies [online]; [available on the internet Oct. 1, 2001]; [retrieved from the internet Jan. 23, 2003].

Dianov, E.M., et al; "Application of Reduced–Pressure Plasma CVD Technology to the Fabrication of Er–doped Optical Fiber", *Optical Materials* (Aug. 1994); vol. 3, No. 3, Amsterdam; pp. 181–185, no date.

*Primary Examiner*—Akm Enayet Ullah
(74) *Attorney, Agent, or Firm*—Gregg H. Rosenblatt (57) ABSTRACT

A co-doped silicate optical waveguide having a core including silica, and oxides of aluminum, germanium, erbium and thulium. The composition concentrations are: Er from 15 ppm to 3000 ppm; Al from 0.5 mol % to 12 mol %; Tm from 15 ppm to 10000 ppm; and Ge from 1 mol % to 20 mol %. In a specific embodiment, the concentration of Er is from 150 ppm to 1500 ppm; Al is from 2 mol % to 8 mol %; and Tm is from 15 ppm to 3000 ppm. A boron-less cladding surrounds the core.

20 Claims, 4 Drawing Sheets

U.S. PATENT DOCUMENTS

| | | |
|---|---|---|
| 2002/0021882 A1 | 2/2002 | Wyatt et al. |
| 2003/0026565 A1 * | 2/2003 | Anderson et al. ............ 385/123 |
| 2003/0099424 A1 * | 5/2003 | Mohajer et al. ............... 385/14 |
| 2003/0118841 A1 * | 6/2003 | Home et al. ............. 428/425.9 |
| 2003/0147620 A1 * | 8/2003 | Anderson et al. ............ 385/142 |
| 2003/0168154 A1 * | 9/2003 | Myers et al. ................ 156/158 |
| 2003/0181307 A1 * | 9/2003 | Myers et al. .................. 501/45 |
| 2003/0203205 A1 * | 10/2003 | Bi et al. ...................... 428/402 |

* cited by examiner

EMISSION SILICATE WAVEGUIDE COMPOSITIONS FOR ENHANCED L-BAND AND S-BAND EMISSION

RELATED APPLICATIONS

The present case is related to co-pending, commonly owned, concurrently filed U.S. Provisional Application Serial No. 60/345,076, filed on Dec. 31, 2001 entitled "Germanium Free Silicate Waveguide Compositions For Enhanced L-Band and S-Band Emission"; U.S. patent application Ser. No. 10/037,731, entitled "Method for Manufacturing Silicate Waveguide Compositions For Extended L-Band and S-Band Amplification"; and U.S. patent application Ser. No. 10/038,370, entitled "Silicate Waveguide Compositions For Extended L-Band and S-Band Amplification", all of which are hereby incorporated by reference.

The present case is related to and claims priority from U.S. Provisional Application Serial No. 60/345,077, entitled "Emission Silicate Waveguide Compositions for Extended L-Band and S-Band Amplification", having a filing date of Dec. 31, 2001.

BACKGROUND OF THE INVENTION

The present invention relates to waveguides having a chemical composition that provides for extended lifetime and enhanced emission in the extended L-(1570–1630+ nm) and S-bands (1450–1530 nm).

High-speed optical telecommunications via optical networks allow for the transfer of extremely large amounts of information through optical signals. As these optical signals travel over long distances or are coupled, manipulated, or directed by optical devices, the signals lose their strength. Signal attenuation may be caused by a number of factors, such as the intrinsic absorption and scattering in the transmission fiber, coupling losses, and bending losses. As a signal becomes weaker, it becomes more difficult to interpret and propagate the signal. Eventually, a signal may become so weak that the information is lost.

Optical amplification is a technology that magnifies or strengthens an optical signal. Optical amplification is a vital part of present-day high-speed optical communications.

Optical amplification is typically performed using devices (amplifiers) that contain a pump laser, a wavelength division multiplexer, isolators, gain shaping gratings, and an active rare-earth-doped optical fiber. The typical wavelength range at which present day optical networks-and optical amplifiers-operate is ~1530–1570 nm, the so-called C-band. A band may be defined as a range of wavelengths, i.e., an operating envelope, within which the optical signals may be handled. A greater number of available bands generally translates into more available communication channels. The more channels, the more information may be transmitted.

Each band is identified with a letter denomination. Band denominations used in the present application are:

| Band | Wavelength Range |
| --- | --- |
| C- | ~1530 to ~1570 nm |
| L- | 1570 to ~1605 nm |
| Extended L-band | 1570 to ~1630 + nm |
| S-band | 1450 to 1530 nm |

Currently, high-speed internet-backbone optical fiber networks rely on optical amplifiers to provide signal enhancement about every 40–100 km. State-of-the-art commercial systems rely on dense wavelength division multiplexing (DWDM) to transmit ~80 10 Gbit/second channels within a narrow wavelength band (e.g. C-band). Channels can be spaced ~0.4 nm apart. These channels can be interleaved with forward and backward transmission (0.4 nm between a forward and backward directed channel) to provide multiterabit/second bidirectional transmission rates over a single fiber.

Recently, with the advent of L-band amplifiers, the optical transmission operating range has been extended from 1530–1565 nm to 1530–1605 nm—using both C- and L-band amplifiers, which provides up to 160 channels/fiber. There is a significant desire for even broader band operation to increase information throughput. Normally operation is limited to a maximum of ~1605 nm by excited state absorption in the erbium-doped fiber. Operation is theoretically limited to ~1650 nm in silicate-based fibers owing to high attenuation owing to multiphonon absorption at wavelengths greater than 1650 nm. Currently, operation is practically limited to ~1630 nm in a fiber system owing to macrobending losses.

Future systems will potentially use wavelengths from 1450 to 1630 nm, which includes the so-called S-band. Use of the S-band has been demonstrated to nearly double the information carrying capacity of existing two stage C- + L-band systems. Transmissions of up to ~10.5 Tb/s over a single fiber using a C +L- + S-band configuration have been shown in a laboratory demonstration.

There are generally three approaches to optical amplification in the 1450–1630 nm region: Raman amplification, amplification with rare-earth-doped fiber amplifiers, and amplification that combines Raman and rare-earth-doped components.

Raman Fiber Amplifiers

Raman amplifiers rely on the combination of input photons with lattice vibration (phonons) to shift the pump light to longer wavelengths (Stokes shift). Amplification spectra are broad, but sometimes have unwanted sharp peaks. The process is inefficient, and requires a high power pump source. Such high power pumps include fiber lasers or a series of laser diodes, which can be quite costly. The process is nonlinear with incident intensity. Because it requires high input intensities, the process may lead to other unwanted nonlinear processes such as 4-wave mixing and self phase modulation. Nonetheless, Raman amplifiers are useful in combination with rare-earth-doped amplifiers to increase span lengths, especially for 10 Gbit/s and faster systems.

Rare-Earth-Doped Fiber Amplifiers

Rare-earth doped amplifiers rely on excitation of electrons in rare-earth ions by an optical pump and subsequent emission of light as the excited ions relax back to a lower energy state. Excited electrons can relax by two radiative processes: spontaneous emission and stimulated emission. The former leads to unwanted noise, the latter provides amplification. Critical parameters for an amplifier are its spectral breadth, noise, and power conversion efficiency (PCE). The latter two parameters correlate with excited state lifetime of the rare-earth ions: longer lifetimes lead to lower noise and higher PCEs. Spectral breadth in the fiber in the C-band, which determines how many channels can be simultaneously amplified in the C-band, correlates with the full-width-half-maximum (FWHM) of the spontaneous emission spectrum of the rare-earth-doped glass.

The majority of commercial amplifiers are based on fibers in which the core glass comprises erbium-doped silicates that contain either aluminum and lanthanum (SALE—

(silicon, aluminum, lanthanum, erbium)) or aluminum and germanium (SAGE). Of the two traditional fiber types, SAGE provides slightly greater spectral width, which allows for additional channels. SALE fiber generally provides slightly higher solubility of rare earth ions, which enables shorter fibers to be used. This is advantageous to minimize, for example, polarization mode dispersion. SALE and SAGE fibers typically provide amplification in the C- or L-bands, but this leaves a large portion of the low-loss region of the silica transmission fiber unused, namely the S-band and long wavelength portion of the extended L-band region (>1610 nm).

In the S-band, rare-earth doped fiber amplifiers typically rely on non-silicate thulium (Tm)-doped glasses. Thulium provides a relatively broad emission that is centered at ~1470 nm. The energy levels of thulium are such that multiphonon processes can easily quench this transition, especially in high phonon energy hosts such as silica. For this reason, lower phonon energy glasses such as heavy-metal oxides (e.g. germanate, tellurite and antimonate glasses) and especially fluoride glasses such as "ZBLAN" are preferred as hosts for the thulium. These non-silicate glasses tend to be difficult to fiberize and splice to existing transmission fiber and to date have limited commercial applications.

In the extended L-band, rare earth doped fibers typically are heavy-metal oxide or fluoride-based. Examples of heavy-metal oxide glasses are those based on tellurium oxide and antimony oxide. Both of these types of glasses are difficult to splice owing to their low melting points and high refractive indices.

In the S- and extended L-band, researchers have worked on an optical amplifier approach using a fiber with a core containing simultaneously erbium and thulium. Unexamined Korean Patent Application; No. 10-1998-00460125 mentions a fiber having a core comprising $SiO_2$, $P_2O_5$, $Al_2O_3$, $GeO_2$, $Er_2O_3$, $Tm_2O_3$ (SPAGET). The Er and Tm ions are in the range of 100–3000 ppm and the core can optionally contain Yb, Ho, Pr, and Tb in addition to Er and Tm. The reference further speaks about a cladding that contains $SiO_2$, F, $P_2O_5$, and $B_2O_3$.

Open literature (R. L Shubochkin et al, "$Er^{3+}$—$Tm^{3+}$ Codoped Silica Fiber Laser", OSA TOPS Vol. 26 Advanced Solid-State Lasers; M. M. Fejer, Hagop Injeyan, and Ursula Keller, Eds; 1999 Optical Society of America, pp 167–171) discusses an Er—Tm codoped silica fiber laser. The laser contained a fiber having a $SiO_2$—$Al_2O_3$—$GeO_2$—$Er_2O_3$—$Tm_2O_3$ core (SAGET) and was pumped at 945–995 nm to obtain emission from Er (~1.55 $\mu$m), Tm (~1.85–1.96 $\mu$m) or both depending upon the parameters of mirrors in the laser cavity, fiber length, pump rate, and pump wavelength. Two fibers were reported. In the first fiber the Er/Tm concentrations were 6000/600 ppm. In the second the concentrations were 1200/6000 ppm. The numerical apertures (NAs) were ~0.27 and ~0.12, respectively. The second mode cutoff was ~1.4 $\mu$m in both. The first fiber exhibited lasing (gain), but the second did not.

Another piece of literature (H. Jeong "Characterization of Amplified Spontaneous Emission Light Source from an $Er^{3+}/Tm^{3+}$ Co-doped Silica Fiber," CLEO 2000, CThV3, pp. 544–545) reports an amplified spontaneous emission (ASE) light source that contains Er and Tm and which exhibits significant emission enhancement in the S-band region compared to sources that contain erbium only. The reported fiber contained an $SiO_2$—$Al_2O_3$—$GeO_2$—$Er_2O_3$—$Tm_2O_3$ core (SAGET) and contained two levels of Er/Tm. In the first fiber the Er/Tm concentrations were 1200/6000 ppm. In the second the concentrations were 300/600 ppm. The NAs of the fibers were 0.2 and 0.22 respectively. In both cases an ~90 nm FWHM forward ASE peak was observed from ~1460–1550 nm. The second fiber had an ASE about 5 dB higher than the first.

However, the above references fail to disclose desired elemental contents and ratios, nor is there any guidance as to the role of different elements in the glass, nor are there reported measurements of lifetime data. Further, the disclosed cladding material contains boron, which can accelerate photodefect formation in germania-containing glasses. Thulium-containing silicate glasses may photodarken. The addition of boron to a germanium-containing silicate fiber further may enhance photodarkening. The boron present in the cladding may diffuse into the core during the thermal processing required to draw a fiber and, in combination with the thulium, thereby enhance photodarkening in the Tm/Ge-containing core.

Accordingly, given the ever increasing demand for broad-band services, it is highly desirable to have a single amplifier, compatible with silicate transmission fiber, that has significant gain at wavelengths between 1570 and ~1630 nm, i.e., extended L-band. An extended L-band amplifier operating to ~1630 nm would enable greater than 50% more channels compared to a conventional L-band amplifier. Thus, there is a desire for silicate-based fibers that provide substantial emission in the extended L-band. It is also desirable to have an economical, S-band amplifier that is compatible with the current fiber infrastructure. A desirable fiber amplifier would provide longer lifetime and/or increased emission intensity compared to existing amplifiers along the desired bands.

SUMMARY OF THE INVENTION

The present invention is directed to improved SAGET optical waveguides and waveguide materials. In particular, the present invention offers improved emission performance over existing optical fiber SAGET compositions.

A co-doped silicate optical waveguide in accordance with the present invention includes a core material comprising silica, and oxides of aluminum, germanium, erbium and thulium. The concentration of Er is from 15 ppm to 3000 ppm; Al is from 0.5 mol % to 12 mol %; Tm is from 15 ppm to 10000 ppm; and Ge is from 1 mol % to 20 mol %. In a more specific embodiment, the concentration of Er is from 150 ppm to 1500 ppm; Al is from 2 mol % to 8 mol %; and Tm is from 15 ppm to 3000 ppm. Note that "mol %" refers to mole percent on a cation basis unless otherwise stated. Also, "ppm" refers to parts per million on a cation basis unless otherwise stated.

The core may further include F. In an exemplary embodiment, the concentration of F is less than or equal to 6 anion mol %.

The waveguide may be an optical fiber, a shaped fiber, a laser rod, or other waveguide structure. An amplifier may be assembled using such waveguides.

In another exemplary embodiment, the core comprises at least a first and a second region, wherein the first region contains a substantially different Er to Tm ratio than the second region. Said regions may be in an annular arrangement. The core may be made by MCVD, sol-gel or soot deposition, solution doping, and consolidation processes.

DETAILED DESCRIPTION OF THE INVENTION

Figure 1:
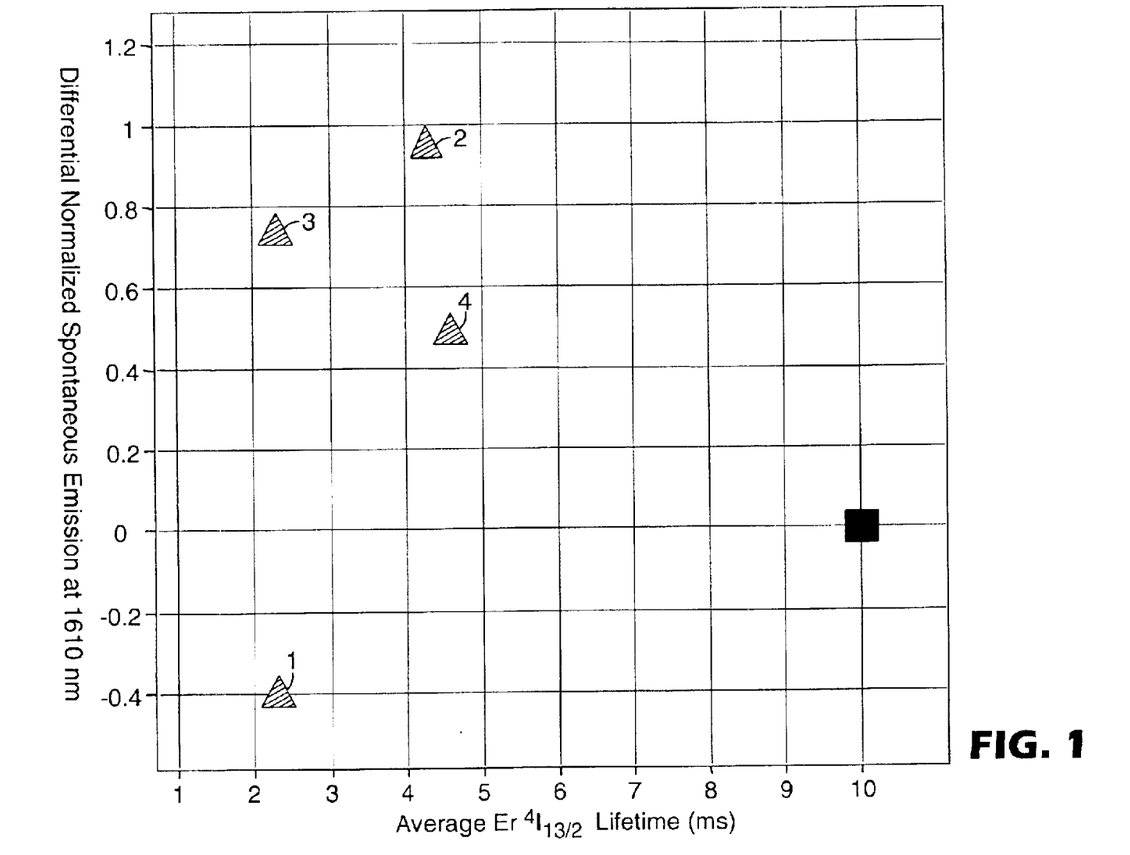
FIG. 1 is a graph of normalized spontaneous emission at 1610 nm vs $Er^{3+}$ $^4I_{13/2}$ average lifetime for four different SAGET glasses.

FIG. 1 is a graph of normalized spontaneous emission at 1610 nm vs $Er^{3+}$ $^4I_{13/2}$ average lifetime for four different SAGET glasses. For one particular embodiment, the intensity of the spontaneous emission at 1600 nm is no less than −8.8 dB relative to the maximum emission intensity at ~1.53 μm and wherein the intensity of the spontaneous emission at 1650 nm is no less than −14.4 dB relative to the maximum emission intensity at ~1.53 μm.

Figure 2:
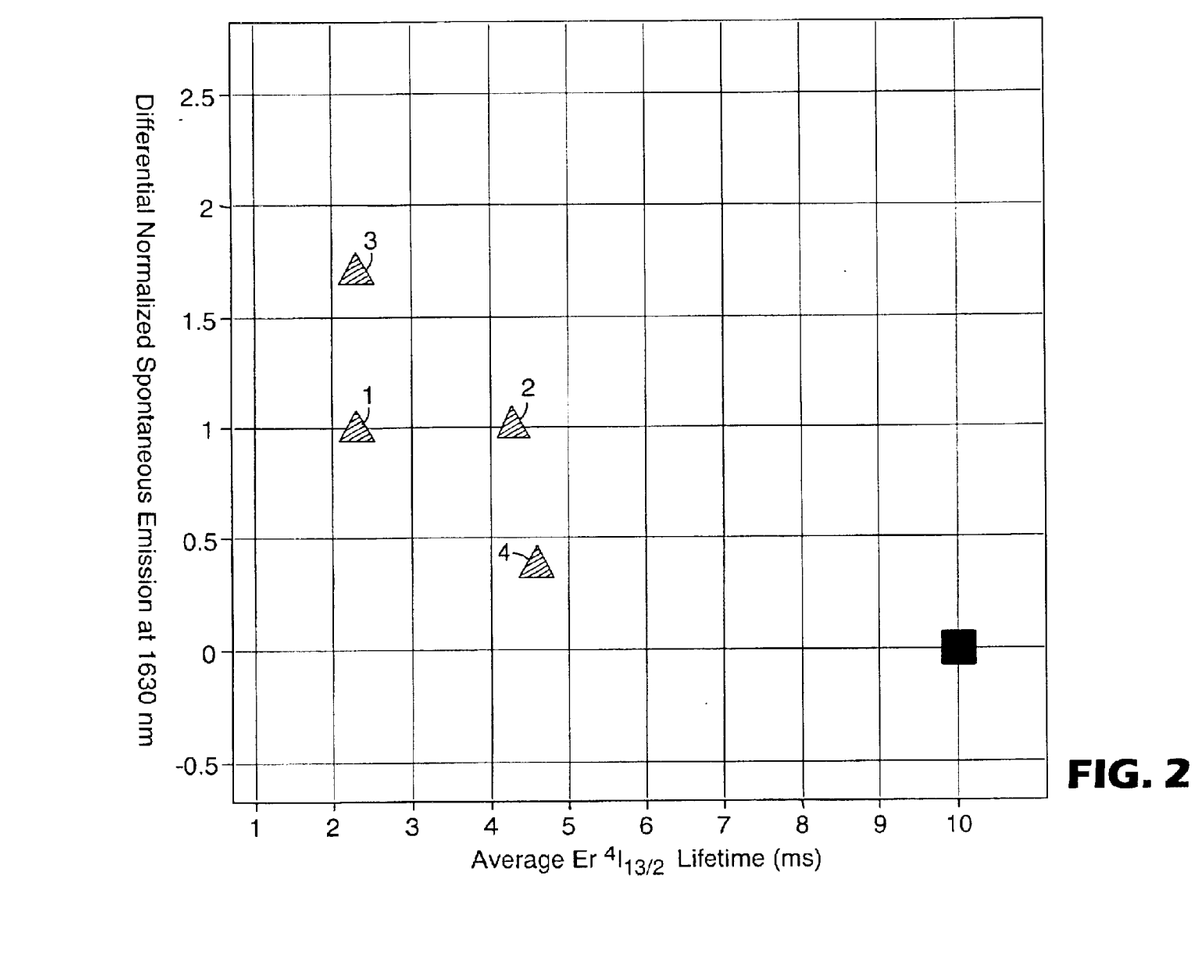
FIG. 2 is a graph of normalized spontaneous emission at 1630 nm vs $Er^{3+}$ $^4I_{13/2}$ average lifetime for four different SAGET glasses.
Figure 3:
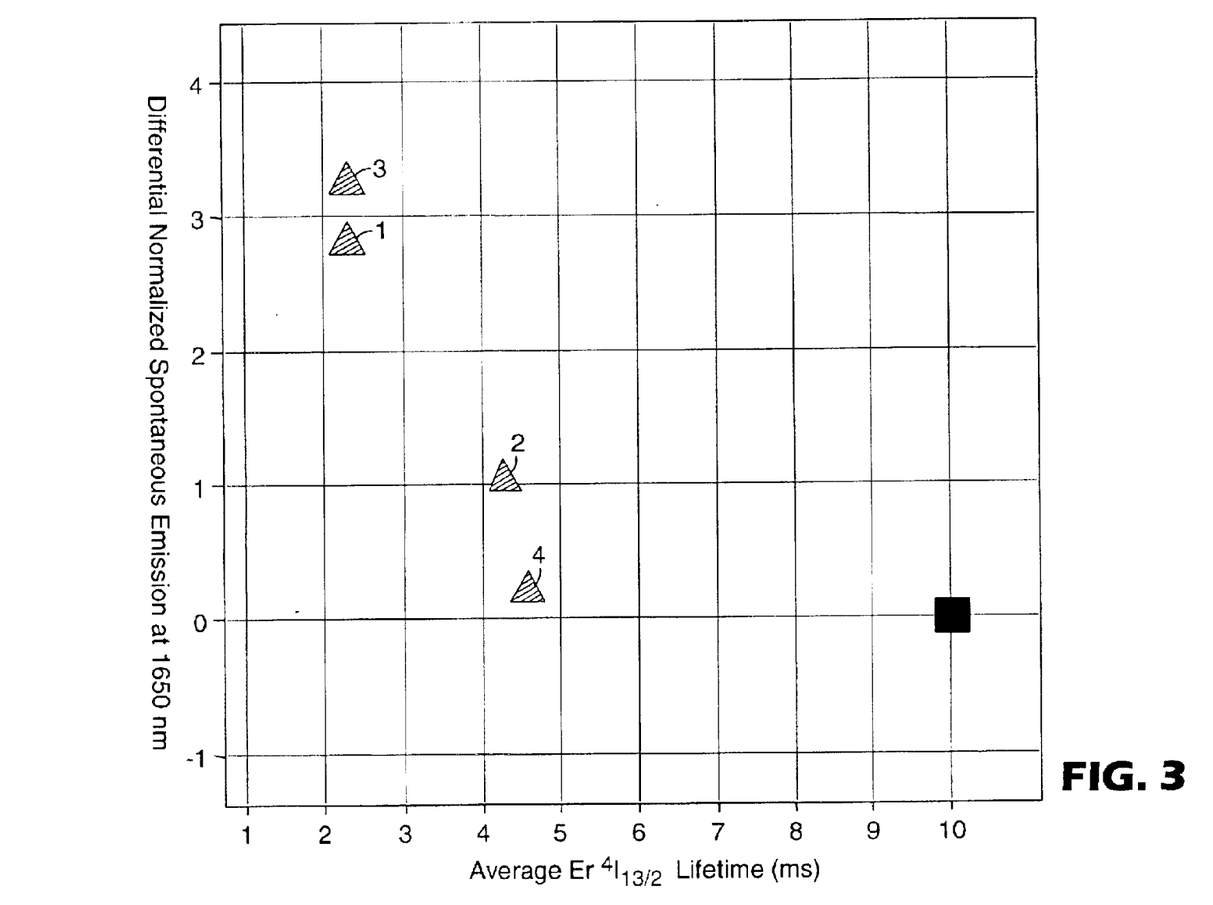
FIG. 3 is a graph of normalized spontaneous emission at 1650 nm vs $Er^{3+}$ $^4I_{13/2}$ average lifetime for four different SAGET glasses.

FIG. 2 is a graph of normalized spontaneous emission at 1630 nm vs $Er^{3+}$ $^4I_{13/2}$ average lifetime for four different SAGET glasses. FIG. 3 is a graph of normalized spontaneous emission at 1650 nm vs $Er^{3+}$ $^4I_{13/2}$ average lifetime for six different SAGET glasses. Numbers correspond to sample numbers in Example 1. The box is a SALE glass, such as is available from 3M Company, St. Paul, Minn.

FIGS. 1–3 show that it is possible to obtain an enhanced normalized emission from SAGET glass as compared to standard erbium-doped SALE glass. The magnitude of the enhancement depends on the host, the amount of thulium, and the Er/Tm ratio.

FIGS. 1–3 further show there is a tradeoff between normalized emission and lifetime. In contrast to the behavior of SALET and SALGET glasses in the 1600–1620 nm region, SAGET compositions with relatively low concentrations of Tm tend to have better extended L-band performance (higher normalized emissions and longer average lifetimes) than SAGET compositions with relatively high Tm concentrations. In the region from 1620–1650 nm SAGET compositions are similar to SALET and SALGET compositions, in that: for relatively low concentrations of Tm they tend to have lower normalized emissions and longer average lifetimes than with high concentrations of Tm. Thus SAGET glasses are of particular interest for relatively low Tm concentrations in the spectral region from 1600–1620 nm. Additionally, in one exemplary embodiment, relatively low Tm concentrations (<1500 ppm) are preferred for optical amplifier fibers.

An exemplary embodiment of the present invention includes a fiber that contains fluorine, which can help solubilize rare earth ions such as erbium and thulium and thus reduce pair induced Er—Er quenching effects.

Figure 4:
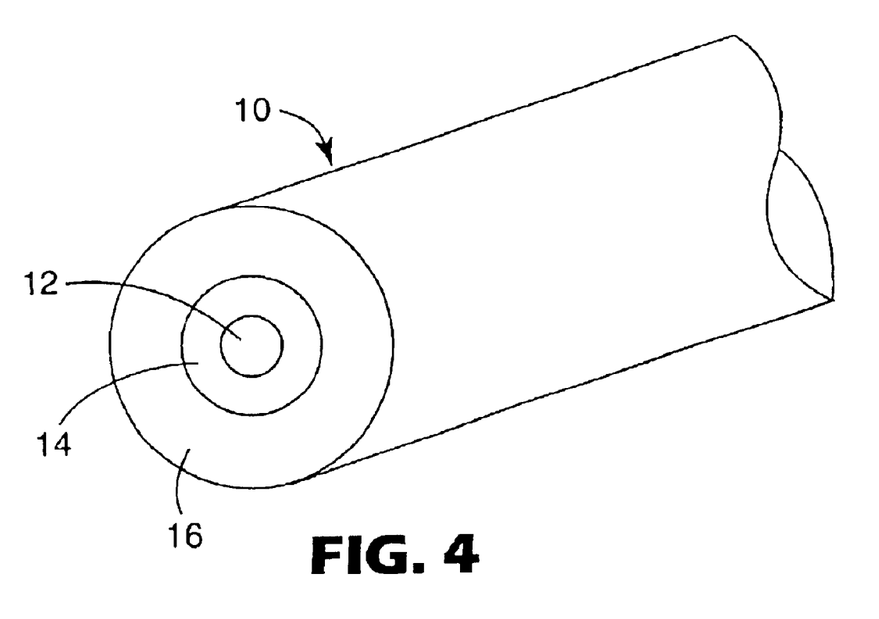
FIG. 4 is a schematic cross-sectional diagram of an exemplary optical fiber in accordance with the present invention.

FIG. 4 illustrates schematically an optical fiber 10 according to the present invention. The fiber 10 includes a core 12, an inner cladding 14, and an outer cladding 16, each respectively concentrically surrounding the other. The core 12 includes silica, and oxides of Al, Ge, Er, and Tm. In an exemplary embodiment, the concentration of Er is from 15 ppm to 3000 ppm, he concentration of Al is from 0.5 mol % to 12 mol %, the concentration of Tm is from 15 ppm to 10000 ppm, and the concentration of Ge is from 1 mol % to 20 mol %. The fiber 10 further includes an inner cladding 14, immediately surrounding the core 12, that is free of boron and contains Si, O, P, and F. Boron increases the sensitivity of Ge toward short-wavelength-induced formation of photodefects. A preform that contains B in the inner cladding results in a fiber with some boron in the core after draw, due to diffusion at high temperature. Tm-doped silicate fibers can emit short wavelength light owing to upconversion processes. Thus, the boron makes a Ge—Tm-containing fiber more sensitive to photodefects and photodarkening caused by upconverted short wavelength light. The present boron-free fiber mitigates this effect.

In another exemplary embodiment, the concentration of Er is from 150 ppm to 1500 ppm; the concentration of Al is from 2 mol % to 8 mol %; and the concentration of Tm is from 15 ppm to 3000 ppm. The core also may include F. In a particular exemplary embodiment, the concentration of F is less than or equal to 6 anion mol %.

In yet another exemplary embodiment, the Er and Tm concentrations vary independently within the core of a fiber or waveguide. This results in different concentrations or Er/Tm ratios at different points or regions within a core. There can be continuous variation in Er and Tm content or multiple discrete regions having different Er and Tm content. By "region" is meant a volume of material at a point or a location that is sufficiently large to allow the glass composition to be defined or determined. Typically, a region would be greater than about 10,000 nm³, but could be much larger, for example, an annular shell that is a significant fraction of a fiber core. Such designs may provide longer excited state lifetimes. For example, close contact of Er and Tm that may lead to inter-ion energy exchange and lifetimes may be reduced.

In one further particular embodiment, waveguides or fibers according to the present invention have radial gradations of Er and Tm concentrations, wherein the respective concentration maxima do not occur at the same radial distances. This may be accomplished by the use of multiple core deposition layers, each with different Er/Tm ratios.

In yet another embodiment, the waveguide or fiber core is segmented into Er-rich and Tm-rich regions, such as by using radial or longitudinal segmentation. This may be accomplished by deposition of alternating annular regions that are relatively rich in Er and relatively rich in Tm respectively.

EXAMPLES

Exemplary Composition 1

The waveguide glass of the present exemplary embodiment may be generically described as $SAGRE_{B1}RE_{B2}$.

S, silica, is the base glass present in approximately >75 mol %. A, aluminum oxide, is believed to act as an index raiser and rare-earth ion solubilizer. Generally, increasing the concentration of Al leads to an increase in the normalized emission intensity, especially from ~1600–~1620 nm and decrease the $^4I_{13/2}$ average lifetime.

G, germanium oxide, is believed to act as an index raiser and network former such as Ge (0–15 mol %).

$RE_{B1}$ is an active rare earth (RE) oxide that contains active $RE_{B1}$ ions such as Er. The oxide is an index raiser. The active $RE_{B1}$ ions may be pumped alone or co-pumped (Er can be pumped at 800, 980, 1480 nm).

$RE_{B2}$ is an active rare earth (RE) oxide that contains active rare earth ions, $RE_{B2}$, such as Tm. The oxide is an index raiser. The active $RE_{B2}$ may be co-pumped or resonantly excited (Tm may be pumped at 800 or 1000–1200 nm).

F, fluorine, acts as an index depressor and provides solubilized rare earth ions.

Optical Data on Bulk Samples

Photoluminescence data was obtained using a fiber pump/collection scheme. A bead of the appropriate glass composition was held via electrostatic forces on the end of a horizontally aligned optical fiber. An x-y translator was used to manipulate the bead within close proximity of the cleaved end of a fiber carrying the pumping wavelength (the pump fiber). Bead position was optimized for maximum fluorescence emission, which was monitored with an optical spectrum analyzer (OSA). The mounting and initial alignment operations were viewed under an optical microscope. The pump laser (typically 980 nm) was coupled to the bead via a wavelength division multiplexer (WDM). The light emitted in the 1450–1700 nm range was collected with the pump fiber and monitored via an OSA.

Differential normalized emission was determined as follows: the normalized value (in dB) at the specified wavelength for a standard SALE fiber was subtracted from the normalized value in dB at that wavelength for the experimental glass. The SALE fiber was standard erbium doped amplifier fiber, such as that available from 3M Company, St. Paul, Minn.

Emission decay curves were collected by pulsing the source light at ~10 Hz and monitoring the decay of the emission intensity. The emission decay curves were normalized and fit with a double exponential fit using standard software. From the decay curve analyses, it was possible to determine upper state lifetimes (slow and fast) of the excited state electrons and the relative percentages of each. Three independent fitting parameters were used in the double exponential analysis: constant for the slow Er radiative decay, $\tau_{slow}$, constant for the fast Er radiative decay, $\tau_{fast}$, and the relative percentages of the two lifetimes $\alpha$.

$$1/\tau_{average} = \alpha * 1/\tau_{fast} = (1-\alpha) * 1/\tau_{slow}$$

Using the McCumber theory, the absorption spectrum was predicted from the emission spectrum. The absorption spectra were then used to calculate Giles parameters, which are utilized in common models for optical amplifiers. The Giles parameters allowed for accurate composition designs for optical fiber manufacturing.

Silica Stock Solution

Tetraethoxysilane (223 mL, available from Aldrich Chemical Company, Milwaukee Wis.); absolute ethanol (223 mL, available from Aaper Alcohol, Shelbyville, Ky.); deionized water (17.28 mL); and 0.07 N hydrochloric acid (0.71 mL) were combined in a 2-L reaction flask. The resulting transparent solution was heated to 60° C. and stirred for 90 minutes. The solution was allowed to cool and was transferred to a plastic bottle and stored in a 0° C. freezer. The resulting solution had a concentration of 2.16 M $SiO_2$.

Example 1

Three Hosts with Four Er/Tm Ratios for Extended L-Band

Erbium-thulium codoped silicate glass beads were prepared with three types of hosts and four Er/Tm levels. To prepare the beads, 2.16 M partially hydrolyzed silica stock solution, 1.0 M aluminum chloride hydrate in methanol, tetraethoxygermane (neat), 0.1 M erbium chloride hydrate in methanol, and 0.1 M thulium nitrate hydrate in methanol were combined in a container. The reagents were mixed so as to give a solution that yielded gels with the compositions (in mol %) shown in Table 1 below.

TABLE 1

| Sample | Er/Tm | $SiO_2$ | $AlO_{1.5}$ | $GeO_2$ | $ErO_{1.5}$ | $TmO_{1.5}$ |
|---|---|---|---|---|---|---|
| 1 | 10/20 | 91.46 | 3.52 | 4.56 | 0.152 | 0.30 |
| 2 | 10/2 | 90.48 | 3.52 | 5.83 | 0.152 | 0.03 |
| 3 | 3/20 | 91.08 | 3.52 | 5.05 | 0.0457 | 0.3 |
| 4 | 3/2 | 90.07 | 3.52 | 6.33 | 0.0457 | 0.03 |

All compositions were batched such that the refractive index was ~1.4800, which, with a silicate cladding in an optical fiber, would provide numerical aperture (NA)~0.25. Compositions 1–4 each were added to a mixture of methanol (250 mL) and 29 weight percent aqueous ammonium hydroxide (50 g). The resulting solutions were stirred until they gelled (about 10 seconds). The gels were isolated by suction filtration. The gels were heated at 80° C. overnight to dry the samples. The dried samples were ground with a ceramic mortar and pestle to reduce the aggregate size to less than 150 micrometers. The ground samples were transferred to alumina boats (Coors) and calcined at 950° C. for about 1 hour in static air to densify and remove all organics.

After grinding in a ceramic mortar with a ceramic pestle, the resulting calcined particles were gravity fed into a hydrogen/oxygen flame. The $H_2/O_2$ ratio in the flame was 5:2. The particles were jetted by the flame onto a water-cooled aluminum incline with a collection trough at the bottom. Glass beads and un-melted particles from each fraction were collected in the trough.

Fluorescence spectra and lifetime data were obtained by the use of the general procedure described above and are shown in FIGS. 1–3.

In an exemplary embodiment, the intensity of the spontaneous emission at 1600 nm is no less than −8.8 dB relative to the maximum emission intensity at ~1.53 $\mu$m and wherein the intensity of the spontaneous emission at 1650 nm is no less than −14.4 dB relative to the maximum emission intensity at ~1.53 $\mu$m.

Fiber Preparation

To prepare an embodiment of a SAGET fiber in accordance with the present invention, a hollow synthetic fused silica tube is cleaned, such as by an acid wash, to remove any foreign matter. The tube is mounted in a lathe for deposition of the inner layers. Several high purity silica-based layers are deposited by chemical vapor deposition (so-called MCVD) by passing a hydrogen/oxygen flame across the tube while flowing $SiCl_4$, $POCl_3$, and $SiF_4$ inside the tube. The innermost layer contains a high concentration of fluorine (e.g. ~4 mol %).

The core of the preform is formed by the solution doping method. A porous silica-germania layer is deposited by MCVD and then infiltrated with a solution that contains Al, Er, and Tm ions. After deposition of the core, the tube is dried, consolidated, and collapsed into a seed preform.

Subsequent thermal processing is performed to adjust the core-to-clad ratio to achieve a desired core diameter in the final fiber. Such subsequent processing may involve multiple stretch and overcollapse steps. The completed preform is then drawn into an optical fiber. The preform is hung in a draw tower. The draw tower includes a furnace to melt the preform, and a number of processing stations, such as for coating, curing and annealing.

A co-doped silicate optical waveguide in accordance with the present invention includes a core material comprising silica, and oxides of aluminum, germanium, erbium and thulium, and a lower refractive index cladding material surrounding the core material. The core material has the following concentrations:

the concentration of Er is from 15 ppm to 3000 ppm, preferably 150 ppm to 1500 ppm;

the concentration of Al is from 0.5 mol % to 12 mol %; preferably 2 mol % to 8 mol %;

the concentration of Tm is from 15 ppm to 10000 ppm; preferably 15 ppm to 3000 ppm; and the concentration of Ge is from 1 mol % to 20 mol %.

The present invention provides significant advantages. SAGET compositions described herein exhibit enhanced extended L-band emission as compared to previously disclosed Er/Tm fibers. SAGET compositions exhibit a combination of good normalized emission in the 1600+ nm region combined with reasonable average Er lifetimes, especially for compositions that contain relatively low concentrations of Er and Tm. The fibers disclosed herein are free of boron. The fibers may contain significant amounts of fluorine in the core, which can help solubilize rare earth ions. The core of the fiber may contain regions of non equal Er/Tm ratios that allow the Er—Tm interactions to be tailored and provide desired optical emission and lifetime response.

Those skilled in the art will appreciate that the present invention may be used in a variety of optical waveguide and optical component applications. While the present invention has been described with a reference to exemplary preferred embodiments, the invention may be embodied in other specific forms without departing from the spirit of the invention. Accordingly, it should be understood that the embodiments described and illustrated herein are only exemplary and should not be considered as limiting the scope of the present invention. Other variations and modifications may be made in accordance with the spirit and scope of the present invention.

What is claimed is:

1. A silicate optical waveguide comprising:
   a) a core comprising silica, and oxides of Al, Ge, Er, and Tm;
      i) wherein the concentration of Er is from 15 ppm to 3000 ppm,
      ii) the concentration of Al is from 0.5 mol % to 12 mol %,
      iii) the concentration of Tm is from 15 ppm to 10000 ppm, and
      iv) the concentration of Ge is from 1 mol % to 20 mol %; and
   b) a boron-free cladding immediately surrounding the core.

2. The waveguide of claim 1, wherein
   a) the concentration of Er is from 150 ppm to 1500 ppm;
   b) the concentration of Al is from 2 mol % to 8 mol %; and
   c) the concentration of Tm is from 15 ppm to 3000 ppm.

3. The waveguide of claim 1, wherein the concentration of Er is from 150 ppm to 1500 ppm.

4. The waveguide of claim 1, wherein the concentration of Al is from 2 mol % to 8 mol %.

5. The waveguide of claim 1, wherein the concentration of Tm is from 15 ppm to 3000 ppm.

6. The waveguide of claim 1, the core further comprising F.

7. The waveguide of claim 6, wherein the concentration of F is less than or equal to 6 anion mol %.

8. The waveguide of claim 1, wherein the waveguide is an optical fiber.

9. An amplifier including the waveguide of claim 1.

10. The waveguide of claim 1, said core comprising at least a first and a second region, wherein the first region contains a substantially different Er to Tm ratio than the second region.

11. The waveguide of claim 10, wherein said regions are in an annular arrangement.

12. The waveguide of claim 10, wherein the core is made with multiple MCVD passes.

13. The waveguide of claim 10, wherein the core is made with multiple sol-gel passes.

14. The waveguide of claim 10, wherein the core is made with multiple soot deposition, solution doping, and consolidation passes.

15. A silicate optical fiber comprising:
   a) a core comprising silica, and oxides of Al, Ge, Er, and Tm;
      i) wherein the concentration of Er is from 15 ppm to 3000 ppm,
      ii) the concentration of Al is from 0.5 mol % to 12 mol %,
      iii) the concentration of Tm is from 15 ppm to 10000 ppm, and
      iv) the concentration of Ge is from 1 mol % to 20 mol %;
   b) wherein the intensity of the spontaneous emission at 1600 nm is no less than −8.8 dB relative to the maximum emission intensity at ~1.53 µm and wherein the intensity of the spontaneous emission at 1650 nm is no less than −14.4 dB relative to the maximum emission intensity at ~1.53 µm.

16. The optical fiber of claim 15, wherein
   a) the concentration of Er is from 150 ppm to 1500 ppm;
   b) the concentration of Al is from 2 mol % to 8 mol %; and
   c) the concentration of Tm is from 15 ppm to 3000 ppm.

17. The optical fiber of claim 15, the core further comprising F, wherein the concentration of F is less than or equal to 6 anion mol %.

18. An amplifier including the optical fiber of claim 15.

19. The optical fiber of claim 15, said core comprising at least a first and a second region, wherein the first region contains a substantially different Er to Tm ratio than the second region.

20. The fiber of claim 19, wherein said regions are in an annular arrangement.

* * * * *

UNITED STATES PATENT AND TRADEMARK OFFICE
CERTIFICATE OF CORRECTION

PATENT NO. : 6,757,474 B2  Page 1 of 1
APPLICATION NO. : 10/299222
DATED : June 29, 2004
INVENTOR(S) : Mark T. Anderson It is certified that error appears in the above-identified patent and that said Letters Patent is hereby corrected as shown below:

Page 2, Column 1, Item (56)
References Cited, under U.S. Patent Documents, Line 4, delete "Home" and insert in place thereof -- Horne --.

Column 2,
Line 28, delete "C +L- + S-band" and insert in place thereof
-- C- + L- + S-band --.

Column 6,
Line 45, after "1" insert -- : --.

Column 7,
Line 35, delete "$1/\tau_{average} = \alpha * 1/\tau_{fast} = (1- \alpha) * 1/\tau_{slow}$" and insert in place thereof -- $1/\tau_{average} = \alpha * 1/\tau_{fast} + (1- \alpha) * 1/\tau_{slow}$ --.

Signed and Sealed this

Fifteenth Day of January, 2008

JON W. DUDAS
*Director of the United States Patent and Trademark Office*